US012422876B2

(12) United States Patent
Gao et al.

(10) Patent No.: US 12,422,876 B2
(45) Date of Patent: Sep. 23, 2025

(54) SELF-ADAPTIVE FAST-RESPONSE LDO CIRCUIT AND CHIP THEREOF

(71) Applicant: VANCHIP (TIANJIN) TECHNOLOGY CO., LTD., Tianjin (CN)

(72) Inventors: Chenyang Gao, Tianjin (CN); Sheng Lin, Tianjin (CN)

(73) Assignee: VANCHIP (TIANJIN) TECHNOLOGY CO., LTD., Tianjin (CN)

( * ) Notice: Subject to any disclaimer, the term of this patent is extended or adjusted under 35 U.S.C. 154(b) by 413 days.

(21) Appl. No.: 18/167,750

(22) Filed: Feb. 10, 2023

(65) Prior Publication Data

US 2023/0195155 A1 Jun. 22, 2023

Related U.S. Application Data

(63) Continuation of application No. PCT/CN2021/111701, filed on Aug. 10, 2021.

(30) Foreign Application Priority Data

Aug. 10, 2020 (CN) ........................ 202010797017.X

(51) Int. Cl.

| | |
|---|---|
| ***G05F 3/26*** | (2006.01) |
| ***G05F 1/565*** | (2006.01) |
| ***G05F 1/575*** | (2006.01) |
| ***G05F 3/30*** | (2006.01) |

(52) U.S. Cl.

CPC .............. *G05F 3/262* (2013.01); *G05F 1/565* (2013.01); *G05F 1/575* (2013.01); *G05F 3/26* (2013.01); *G05F 3/30* (2013.01)

(58) Field of Classification Search

CPC .......... G05F 3/262; G05F 1/565; G05F 1/575; G05F 3/26; G05F 3/30

See application file for complete search history.

(56) References Cited

U.S. PATENT DOCUMENTS

| | | | | |
|---|---|---|---|---|
| 6,188,212 B1 * | 2/2001 | Larson | G05F 1/56 | 323/281 |
| 7,129,686 B1 * | 10/2006 | Huang | G05F 1/575 | 323/314 |
| 7,402,984 B1 * | 7/2008 | Huang | G05F 1/56 | 323/280 |

(Continued)

*Primary Examiner* — Yusef A Ahmed

(74) *Attorney, Agent, or Firm* — George Guosheng Wang; Upstream Research and Patent LLC

(57) ABSTRACT

Disclosed are a self-adaptive fast-response LDO circuit and a chip thereof. Said circuit includes a band gap reference circuit, an error amplifier, a power tube, a feedback resistor network, and a self-adaptive acceleration response circuit. The current of the power tube is mirrored by means of the self-adaptive acceleration response circuit, such that the tail current of a differential circuit in the error amplifier can accelerate charging and discharging adaptively according to load changes of the LDO circuit. In addition, before the LDO circuit is stably balanced, the characteristics of unbalanced states of two differential input ends of the error amplifier are used to perform fast charging and discharging on the tail current of the differential circuit and a gate electrode of the power tube in an extremely short time, such that the response time of the LDO circuit is greatly reduced.

10 Claims, 4 Drawing Sheets

(56) References Cited

U.S. PATENT DOCUMENTS

| | | | | |
|---|---|---|---|---|
| 7,521,909 | B2 * | 4/2009 | Dow | G05F 1/575 323/280 |
| 8,089,743 | B2 * | 1/2012 | Jian | G05F 1/573 323/274 |
| 8,169,204 | B2 * | 5/2012 | Jian | G05F 1/573 323/273 |
| 8,947,069 | B2 * | 2/2015 | Fort | G05F 3/30 327/539 |
| 11,886,215 | B2 * | 1/2024 | Fiocchi | G05F 1/575 |
| 12,093,067 | B1 * | 9/2024 | Huang | G05F 1/567 |
| 12,111,675 | B1 * | 10/2024 | Can | G05F 3/30 |
| 2002/0130646 | A1 * | 9/2002 | Zadeh | G05F 1/575 323/275 |
| 2003/0214275 | A1 * | 11/2003 | Biagi | G05F 1/575 323/280 |
| 2005/0168272 | A1 * | 8/2005 | Banerjee | G05F 1/565 327/541 |
| 2006/0197513 | A1 * | 9/2006 | Tang | H03F 3/345 323/273 |
| 2008/0122528 | A1 * | 5/2008 | Akita | G05F 1/575 327/540 |
| 2008/0218137 | A1 * | 9/2008 | Okuyama | G05F 1/575 323/273 |
| 2009/0108918 | A1 * | 4/2009 | Chellappa | G05F 3/30 327/539 |
| 2009/0315526 | A1 * | 12/2009 | Do Couto | G05F 1/575 323/275 |
| 2010/0148857 | A1 * | 6/2010 | Chellappa | G05F 3/242 327/538 |
| 2011/0068758 | A1 * | 3/2011 | Chiu | G05F 1/575 323/280 |
| 2013/0249294 | A1 * | 9/2013 | Saito | G05F 1/575 307/43 |
| 2014/0117958 | A1 * | 5/2014 | Price | G05F 1/468 323/281 |
| 2014/0117966 | A1 * | 5/2014 | Shaeffer | G05F 3/02 323/313 |
| 2014/0125300 | A1 * | 5/2014 | Price | G05F 1/468 323/281 |
| 2015/0097534 | A1 * | 4/2015 | Bhattad | G05F 1/56 323/270 |
| 2015/0130427 | A1 * | 5/2015 | Chou | G05F 1/46 323/269 |
| 2015/0153753 | A1 * | 6/2015 | Fort | G05F 1/625 323/282 |
| 2015/0220096 | A1 * | 8/2015 | Luff | G02F 1/1368 323/273 |
| 2016/0048148 | A1 * | 2/2016 | Lee | G05F 1/575 323/280 |
| 2017/0139435 | A1 * | 5/2017 | Arnold | G05F 3/16 |
| 2017/0315574 | A1 * | 11/2017 | Brown | G05F 1/468 |
| 2018/0120876 | A1 * | 5/2018 | Petenyi | G05F 1/575 |
| 2019/0004553 | A1 * | 1/2019 | Ming | H03F 3/3061 |
| 2023/0205246 | A1 * | 6/2023 | Roh | G05F 1/575 |
| 2023/0280774 | A1 * | 9/2023 | Kong | G05F 1/468 323/280 |

* cited by examiner

SELF-ADAPTIVE FAST-RESPONSE LDO CIRCUIT AND CHIP THEREOF

BACKGROUND

Technical Field

The present invention relates to a self-adaptive fast-response low dropout regulator (LDO) circuit, and also relates to an integrated circuit chip including the LDO circuit, belonging to the technical field of analog integrated circuits.

Related Art

With the development of the communication technology, higher requirements are put forward for performance of electronic terminals, such as conduction time, switching time and turn-off time. Therefore, analog integrated circuits are required to have a faster response speed, and a power bias circuit responsible for providing direct current operating points for analog integrated circuits is the first to bear the brunt. As a common power bias circuit, an LDO circuit also faces the urgent requirement for reducing the response time.

The Chinese invention patent ZL201710905386.4 provides a fast-response LDO circuit, which can generate a very large current drive with a very small static power consumption through AB type drive circuits, so as to accelerate the establishment of a signal at a control end of a power transistor under the condition of a certain power consumption, thereby increasing the adjusting speed of a loop. On the other hand, the Chinese Patent Application 201711004540.7 also provides an LDO circuit, which can quickly respond to the change of an output voltage by adopting a transient response circuit to quickly adjust a drive voltage of a power device, thereby improving the transient characteristics of the LDO circuit and increasing the alternating current accuracy of the LDO circuit. However, the disadvantages of the above two LDO circuits are as follows: the circuit series and the feedback capacitance are increased, which will affect the loop stability of the circuit and even deteriorate the performance of an original LDO circuit; and the fast response circuit cannot be adjusted in real time according to load changes, thereby limiting the application scope.

SUMMARY

A primary technical problem to be solved by the present invention is to provide a self-adaptive fast-response LDO circuit.

Another technical problem to be solved by the present invention is to provide an integrated circuit chip including the above LDO circuit and a corresponding electronic terminal.

In order to achieve the above objectives, the present invention adopts the following technical solutions:

According to a first aspect of an embodiment of the present invention, a self-adaptive fast-response LDO circuit is provided, including a band gap reference circuit, an error amplifier, a power transistor, a feedback resistor network, and a self-adaptive acceleration response circuit, where an output end of the band gap reference circuit is connected with a non-inverting input end of the error amplifier, an inverting input end of the error amplifier is connected with the feedback resistor network, an output end of the error amplifier is connected with a gate electrode of the power transistor, the error amplifier and the power transistor are respectively connected with the self-adaptive acceleration response circuit, and a drain electrode of the power transistor is connected with the feedback resistor network.

Preferably, the self-adaptive acceleration response circuit includes an acceleration charging circuit, a self-adaptive acceleration charging and discharging circuit, and an acceleration discharging circuit, where the acceleration charging circuit is connected with two current output ends and a tail current end of the differential circuit, the self-adaptive acceleration charging and discharging circuit is respectively connected with the gate electrode of the power transistor and the tail current end of the differential circuit, and the acceleration discharging circuit is respectively connected with a first node, a second node and the gate electrode of the power transistor.

Preferably, the acceleration charging circuit includes a first N-channel metal oxide semiconductor (NMOS) transistor, a first P-channel metal oxide semiconductor (PMOS) transistor, a second PMOS transistor, a third PMOS transistor, a fourth PMOS transistor, and a second NMOS transistor, where a gate electrode of the first NMOS transistor is connected with the current output end corresponding to a reference voltage end of the differential circuit, a drain electrode of the first NMOS transistor is respectively connected with a drain electrode and a gate electrode of the first PMOS transistor, the gate electrode of the first PMOS transistor is connected with a gate electrode of the second PMOS transistor, a drain electrode of the second PMOS transistor is respectively connected with a drain electrode and a gate electrode of the third PMOS transistor and a drain electrode of the second NMOS transistor, the gate electrode of the third PMOS transistor is connected with a gate electrode of the fourth PMOS transistor, a drain electrode of the fourth PMOS transistor is connected with the tail current end of the differential circuit, and a gate electrode of the second NMOS transistor is connected with the current output end corresponding to a feedback end of the differential circuit.

Preferably, the first NMOS transistor, the first PMOS transistor and the second PMOS transistor mirror the current at the non-inverting input end in a preset ratio to obtain a first current, and the second NMOS transistor mirrors the current at the inverting input end in a preset ratio to obtain a second current; and when the second current is greater than the first current, a first differential sub-current is obtained according to a difference between the second current and the first current and is output to the third PMOS transistor, and the first differential sub-current is mirrored by the fourth PMOS transistor and then output to the differential circuit as a tail current.

Preferably, the acceleration charging circuit further includes a third NMOS transistor, a fourth NMOS transistor, a fifth PMOS transistor, a sixth PMOS transistor, a seventh PMOS transistor, and an eighth PMOS transistor, where a gate electrode of the third NMOS transistor is connected with the current output end corresponding to the reference voltage end of the differential circuit, a drain electrode of the third NMOS transistor is respectively connected with a drain electrode of the sixth PMOS transistor and a drain electrode and a gate electrode of the seventh PMOS transistor, the gate electrode of the seventh PMOS transistor is connected with a gate electrode of the eighth PMOS transistor, a drain electrode of the eighth PMOS transistor is connected with the tail current end of the differential circuit, a gate electrode of the fourth NMOS transistor is connected with the current output end corresponding to the feedback end of the differential circuit, a drain electrode of the fourth NMOS transistor is connected with a drain electrode and a gate electrode of the fifth PMOS transistor, and the gate electrode of the fifth PMOS transistor is connected with a gate electrode of the sixth PMOS transistor.

Preferably, the third NMOS transistor mirrors the current at the non-inverting input end in a preset ratio to obtain a fifth current, and the fourth NMOS transistor, the fifth PMOS transistor and the sixth PMOS transistor mirror the current at the inverting input end in a preset ratio to obtain a sixth current; and when the sixth current is greater than the fifth current, a second differential sub-current is obtained according to a difference between the sixth current and the fifth current and is output to the seventh PMOS transistor, and the second differential sub-current is mirrored by the eighth PMOS transistor and then output to the differential circuit as a tail current.

Preferably, the self-adaptive acceleration charging and discharging circuit includes a ninth PMOS transistor, where a gate electrode of the ninth PMOS transistor is connected with the gate electrode of the power transistor, and a drain electrode of the ninth PMOS transistor is connected with the tail current end of the differential circuit.

Preferably, the acceleration discharging circuit includes a fifth NMOS transistor, a sixth NMOS transistor, a tenth PMOS transistor, an eleventh PMOS transistor, a seventh NMOS transistor, an eighth NMOS transistor, a twelfth PMOS transistor, and a thirteenth PMOS transistor, where a gate electrode of the fifth NMOS transistor is connected with the first node, a drain electrode of the fifth NMOS transistor is respectively connected with a gate electrode and a drain electrode of the tenth PMOS transistor, a gate electrode of the sixth NMOS transistor is connected with the second node, a drain electrode of the sixth NMOS transistor is respectively connected with a drain electrode of the eleventh PMOS transistor and a gate electrode and a drain electrode of the seventh NMOS transistor, a gate electrode of the eleventh PMOS transistor is connected with the gate electrode of the tenth PMOS transistor, the gate electrode of the seventh NMOS transistor is connected with a gate electrode of the eighth NMOS transistor, a drain electrode of the eighth NMOS transistor is respectively connected with a gate electrode and a drain electrode of the twelfth PMOS transistor, the gate electrode of the twelfth PMOS transistor is connected with a gate electrode of the thirteenth PMOS transistor, and a drain electrode of the thirteenth PMOS transistor is connected with the gate electrode of the power transistor.

Preferably, the fifth NMOS transistor, the tenth PMOS transistor and the eleventh PMOS transistor mirror the current at the non-inverting input end in a preset ratio to obtain a third current, and the sixth NMOS transistor mirrors the current at the inverting input end in a preset ratio to obtain a fourth current; and a second differential current obtained according to a difference between the third current and the fourth current is output to the seventh NMOS transistor, and the second differential current is mirrored by the seventh NMOS transistor, the eighth NMOS transistor, the twelfth PMOS transistor and the thirteenth PMOS transistor and then output to the gate electrode of the power transistor.

Preferably, the self-adaptive acceleration response circuit obtains the first differential current and the second differential current respectively according to the currents at two differential input ends in the error amplifier and establishes a mirror in a preset ratio, and then, the mirror is correspondingly output to the gate electrode of the power transistor and the differential circuit as the tail current thereof to accelerate discharging or charging, where the first differential current is the first differential sub-current, or the first differential current is the superposition of the first differential sub-current and the second differential sub-current.

Preferably, the self-adaptive acceleration response circuit establishes a mirror of the current of the power transistor in a preset ratio as the tail current of the differential circuit, so as to accelerate discharging or charging according to load changes.

According to a second aspect of an embodiment of the present invention, an integrated circuit chip is provided. The integrated circuit chip includes the above self-adaptive fast-response LDO circuit.

According to the self-adaptive fast-response LDO circuit provided in this embodiment of the present invention, by additionally providing a self-adaptive acceleration response circuit on an existing typical LDO circuit, on the one hand, the current of the power transistor is mirrored in a preset ratio, such that the tail current of the differential circuit in the error amplifier can accelerate charging and discharging adaptively according to load changes of the LDO circuit. On the other hand, before the circuit is stably balanced, the characteristics of unbalanced states of two differential input ends of the error amplifier are used to perform fast charging and discharging on the tail current of the differential circuit and the gate electrode of the power transistor in an extremely short time, such that the response time of the LDO circuit is greatly reduced, and the integrated circuit chip has a faster response speed, thereby satisfying high requirements for performance of the electronic terminal, such as conduction time, switching time and turn-off time.

DETAILED DESCRIPTION

The technical contents of the present invention will be further described in detail below with reference to the accompanying drawings and specific embodiments.

Figure 1:
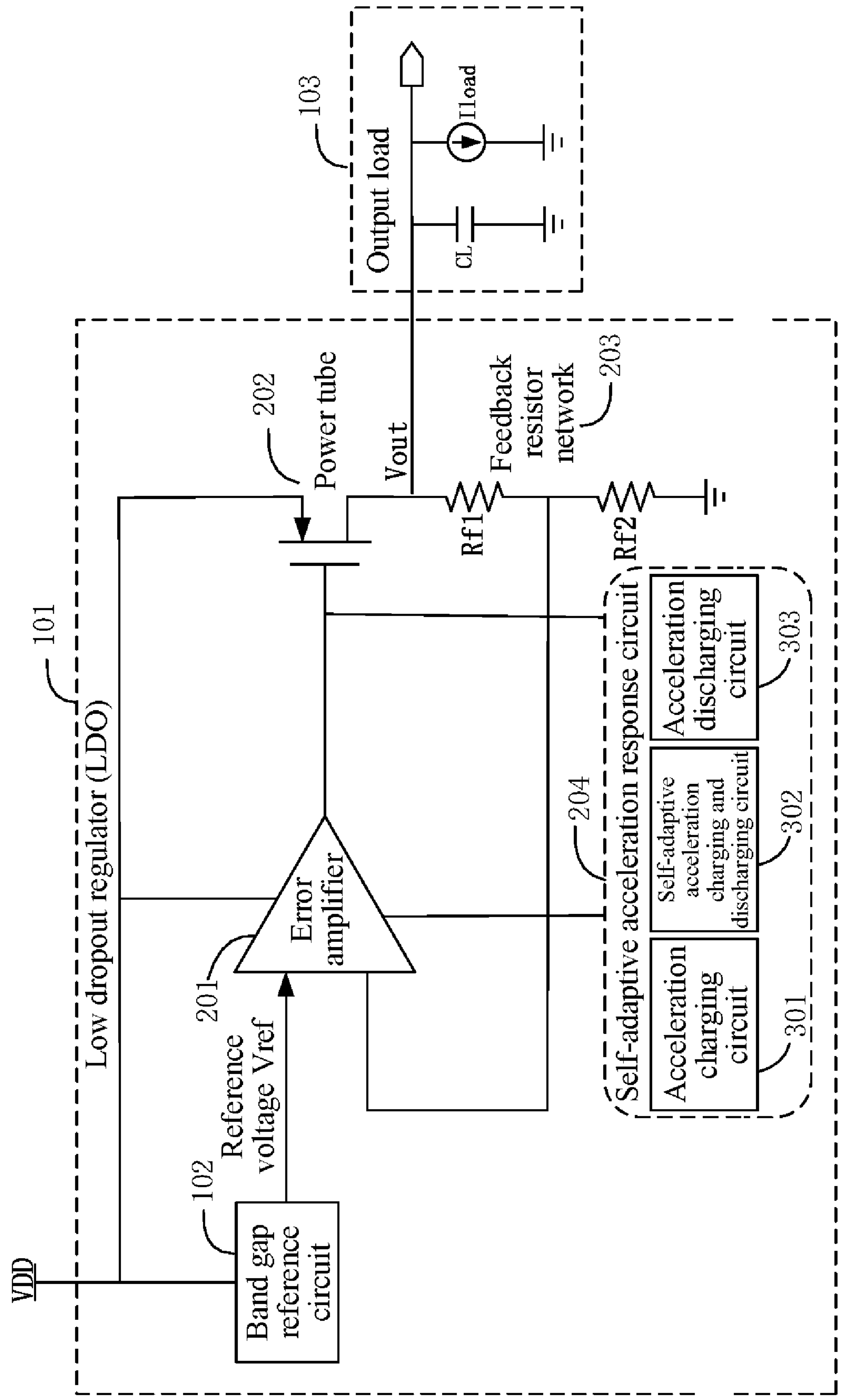
FIG. 1 is a schematic diagram of a self-adaptive fast-response LDO circuit provided in an embodiment of the present invention.

In order to reduce the response time of the LDO circuit and enable the integrated circuit chip to have a faster response speed, so as to satisfy high requirements for performance of the electronic terminal, such as conduction time, switching time and turn-off time, as shown in FIG. 1, an embodiment of the present invention provides a self-adaptive fast-response LDO circuit 101, including a band gap reference circuit 102, an error amplifier 201, a power transistor 202, a feedback resistor network 203, and a self-adaptive acceleration response circuit 204. An output end of the band gap reference circuit 102 is connected with a non-inverting input end of the error amplifier 201, an inverting input end of the error amplifier 201 is connected with the feedback resistor network 203, an output end of the error amplifier 201 is connected with a gate electrode of the power transistor 202, the error amplifier 201 and the power transistor 202 are respectively connected to the self-adaptive acceleration response circuit 204, and a drain electrode of the power transistor 202 is connected with the feedback resistor network 203 to form an output end of the self-adaptive fast-response LDO circuit 101 to connect an output load 103. A VDD (Voltage Drain Drain) is respectively connected with the band gap reference circuit 102, the error amplifier 201 and the power transistor 202, and the feedback resistor network 203 is grounded.

The band gap reference circuit 102, the error amplifier 201, the power transistor 202 and the feedback resistor network 203 form a basic structure of a typical LDO circuit. The band gap reference circuit 102 is used for generating a reference voltage Vref and a bias current, and the reference voltage Vref is supplied to the error amplifier 201 as an input reference voltage. The error amplifier 201, the power transistor 202 and the feedback resistor network 203 form a negative feedback loop to realize voltage clamping. The feedback resistor network 203 is composed of a resistor Rf1 and a resistor Rf2 in series.

An expression of an output voltage Vout of the typical LDO circuit is:

$$V_{out} = \frac{Rf1 + Rf2}{Rf2} * Vref \tag{1}$$

where $$\frac{Rf1 + Rf2}{Rf2}$$

represents a gain coefficient of the LDO circuit, the magnitude of the gain coefficient is determined by a proportional relation between the resistor Rf1 and the resistor Rf2, and the output voltage Vout is determined together by the reference voltage and the gain coefficient. It is not difficult to find that the self-adaptive fast-response LDO circuit 101 provided in this embodiment of the present invention is additionally provided with the self-adaptive acceleration response circuit 204 on the basis of the typical LDO circuit, thereby reducing the response time of the LDO circuit.

The self-adaptive acceleration response circuit 204 is configured to respectively obtain a first differential current and a second differential current according to current values of two differential input ends and establish a mirror in a preset ratio by means of the characteristics of unbalanced states of the two differential input ends of the error amplifier 201 before the self-adaptive fast-response LDO circuit is stably balanced, and then correspondingly output the mirror to a differential circuit as a tail current and the gate electrode of the power transistor 202 to correspondingly accelerate charging or discharging, thereby realizing the acceleration response of the LDO circuit. In addition, a mirror of the current of the power transistor 202 is established in a preset ratio as the tail current of the differential circuit, so as to further increase the response speed of the circuit and accelerate discharging or charging according to load changes.

Figure 2:
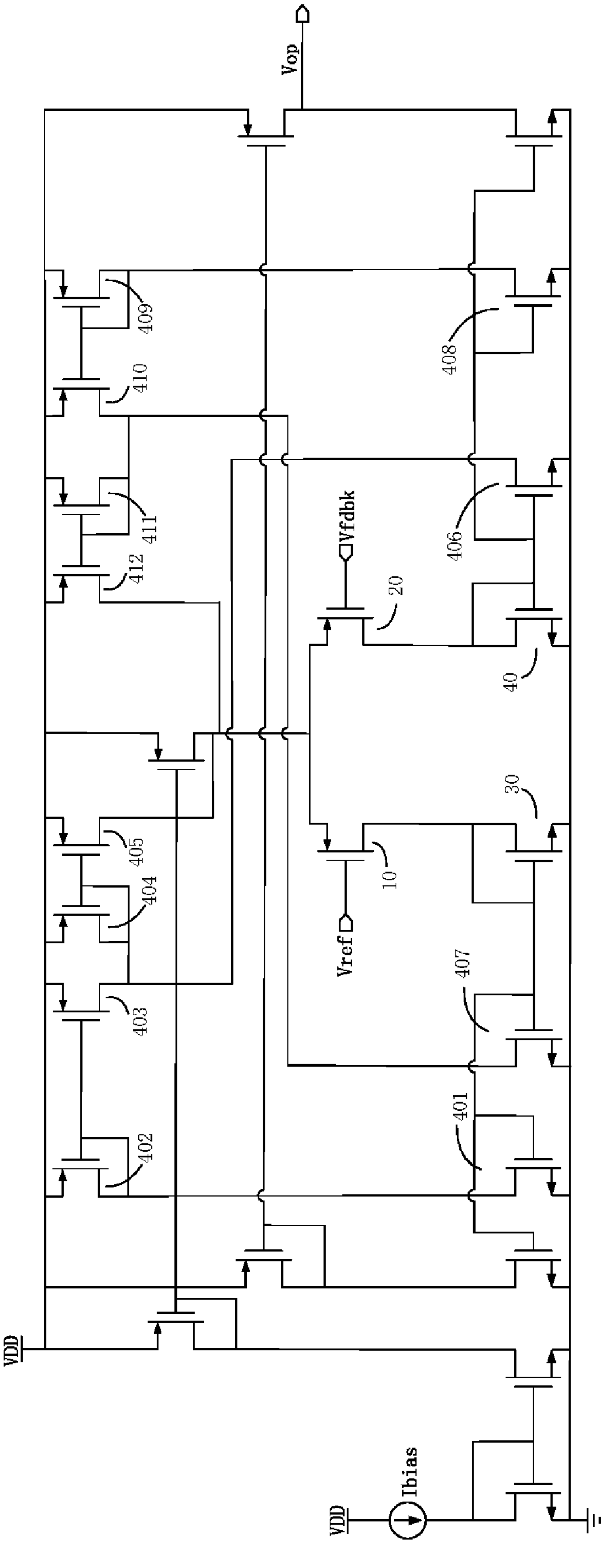
FIG. 2 is a schematic diagram of an acceleration charging circuit in the self-adaptive fast-response LDO circuit provided in this embodiment of the present invention.

The two differential input ends are the non-inverting input end and the inverting input end of the error amplifier 201 respectively. As shown in FIG. 2, a gate electrode of a PMOS transistor 10 of the differential circuit is used as the non-inverting input end of the error amplifier 201 to connect the output end of the band gap reference circuit 102 to receive the reference voltage Vref, and a drain electrode of the PMOS transistor 10 of the differential circuit is connected with a drain electrode of an NMOS transistor 30 to receive the current of the PMOS transistor 10. A gate electrode of the NMOS transistor 30 is used as the current output end corresponding to the reference voltage end of the differential circuit to output the current of the PMOS transistor 10. A gate electrode of a PMOS transistor 20 of the differential circuit is used as the inverting input end of the error amplifier 201 to connect the feedback resistor network 203 to receive a feedback voltage Vfdbk. A drain electrode of the PMOS transistor 20 of the differential circuit is connected with a drain electrode of an NMOS transistor 40 to receive the current of the gate electrode of the PMOS transistor 20. A gate electrode of the NMOS transistor 40 is used as the current output end corresponding to the feedback end of the differential circuit to output the current of the PMOS transistor 20. Source electrodes of the PMOS transistor 10 and the PMOS transistor 20 of the differential circuit are connected together as the tail current end of the differential circuit. Before operating points of the LDO circuit are stabilized, the tail current end of the LDO circuit is superposed with the first differential current provided by the self-adaptive acceleration response circuit 204.

As shown in FIG. 1 to FIG. 4, the self-adaptive acceleration response circuit includes an acceleration charging circuit 301, a self-adaptive acceleration charging and discharging circuit 302, and an acceleration discharging circuit 303. The acceleration charging circuit 301 is connected with the two current output ends (that is, the current output end corresponding to the reference voltage end and the current output end corresponding to the feedback end) of the differential circuit in the error amplifier 201 and the tail current end thereof. The self-adaptive acceleration charging and discharging circuit 302 is respectively connected with the gate electrode of the power transistor 202 and the tail current end of the differential circuit. The acceleration discharging circuit 303 is respectively connected with a first node Vn1, a second node Vn2 and the gate electrode of the power transistor 202, where the first node Vn1 is connected with the drain electrode of the PMOS transistor 10 of the differential circuit to output the current of the PMOS transistor 10; and the first node Vn2 is connected with the drain electrode of the PMOS transistor 20 of the differential circuit to output the current of the PMOS transistor 20.

Before the self-adaptive fast-response LDO circuit is stably balanced, by means of the characteristics of unbalanced states of the two differential input ends of the error amplifier 201, the acceleration charging circuit 301 obtains a first differential current according to current values of the two differential input ends and establishes a mirror in a preset ratio, and then correspondingly outputs the mirror to the differential circuit as a tail current. The acceleration charging circuit 301 can have two structures. The acceleration charging circuit 301 having the first structure obtains a first differential sub-current according to current values of the two differential input ends by means of the characteristics of unbalanced states of the two differential input ends of the error amplifier 201. The acceleration charging circuit 301 having the second structure obtains a first differential sub-current and a second differential sub-current according to current values of the two differential input ends by means of the characteristics of unbalanced states of the two differential input ends of the error amplifier 201. Therefore, in an embodiment of the present invention, the first differential current obtained by the acceleration charging circuit 301 according to current values of the two differential input ends can be the first differential sub-current. Alternatively, in another embodiment of the present invention, the first differential current can be the superposition of the first differential sub-current and the second differential sub-current. It should be noted that the superposition here refers to the utility superposition rather than the current summation, that is, the superposition of the function of the second differential sub-current on the basis of the function of the first differential sub-current.

Specifically, as shown in FIG. 2, in an embodiment of the present invention, the acceleration charging circuit 301 includes a first NMOS transistor 401, a first PMOS transistor 402, a second PMOS transistor 403, a third PMOS transistor 404, a fourth PMOS transistor 405, and a second NMOS transistor 406. A gate electrode of the first NMOS transistor 401 is connected with the current output end corresponding to the reference voltage end of the differential circuit in the error amplifier 201 (the gate electrode of the NMOS transistor 30), a drain electrode of the first NMOS transistor 401 is respectively connected with a drain electrode and a gate electrode of the first PMOS transistor 402, the gate electrode of the first PMOS transistor 402 is connected with a gate electrode of the second PMOS transistor 403, a drain electrode of the second PMOS transistor 403 is respectively connected with a drain electrode and a gate electrode of the third PMOS transistor 404 and a drain electrode of the second NMOS transistor 406, the gate electrode of the third PMOS transistor 404 is connected with a gate electrode of the fourth PMOS transistor 405, a drain electrode of the fourth PMOS transistor 405 is connected with the tail current end of the differential circuit, a gate electrode of the second NMOS transistor 406 is connected with the current output end corresponding to the feedback end of the differential circuit (the gate electrode of the NMOS transistor 40), source electrodes of the first PMOS transistor 402, the second PMOS transistor 403, the third PMOS transistor 404 and the fourth PMOS transistor 405 are connected with the VDD, and source electrodes of the first NMOS transistor 401 and the second NMOS transistor 406 are grounded.

The first NMOS transistor 401 and the NMOS transistor 30 as well as the first PMOS transistor 402 and the second PMOS transistor 403 respectively form current mirror circuits. The current at the non-inverting input end is mirrored in a preset ratio by the first NMOS transistor 401 and then transmitted to the first PMOS transistor 402, and is mirrored in a preset ratio by the second PMOS transistor 403 to obtain a first current in a preset ratio to the current at the non-inverting input end. The current at the inverting input end is mirrored in a preset ratio by the second NMOS transistor 406 to obtain a second current. Before the self-adaptive fast-response LDO circuit 101 is stably balanced, the currents corresponding to the two differential input ends are not equal, that is, the current at the non-inverting input end is not equal to the current at the inverting input end. When the second current is greater than the first current, the first differential current obtained according to a difference between the second current and the first current is greater than 0, that is, the first differential sub-current can be output to the third PMOS transistor 404. When the second current is less than or equal to the first current, the first differential current is 0, and the current of the third PMOS transistor 404 is 0. The first differential current output to the third PMOS transistor 404 is mirrored by the fourth PMOS transistor 405 in a preset ratio and then output to the differential circuit as a tail current, so when the self-adaptive fast-response LDO circuit 101 starts to establish a response under the condition that the two differential input ends are unstable (the currents corresponding to the two differential input ends are not equal), the tail current will have a large charging current, which enables the self-adaptive fast-response LDO circuit 101 to be established in an extremely short time, so as to complete the fast response from unstable to stable. Moreover, after the stably balanced state of the circuit is established, voltages of the two differential input ends are equal or approximately equal, and at this time, the tail current of the differential circuit returns to a normal value. As a result, after the self-adaptive fast-response LDO circuit 101 is stabilized, the tail current of the differential circuit will return to the value of a balanced state and no longer consume the current, so the acceleration charging circuit 301 only affects the state before the circuit is stably balanced, but does not affect the stably balanced state of the circuit.

As shown in FIG. 2, in another embodiment of the present invention, the acceleration charging circuit 301 is formed by additionally providing another acceleration charging circuit composed of a third NMOS transistor 407, a fourth NMOS transistor 408, a fifth PMOS transistor 409, a sixth PMOS transistor 410, a seventh PMOS transistor 411 and an eighth PMOS transistor 412 on the basis of the acceleration charging circuit composed of the MOS transistors 401-406, where the connection relationship between parts of the additionally provided acceleration charging circuits is: a gate electrode of the third NMOS transistor 407 is connected with the current output end corresponding to the reference voltage end of the differential circuit in the error amplifier 201 (the gate electrode of the NMOS transistor 30), a drain electrode of the third NMOS transistor 407 is respectively connected with a drain electrode of the sixth PMOS transistor 410 and a drain electrode and a gate electrode of the seventh PMOS transistor 411, the gate electrode of the seventh PMOS transistor 411 is connected with a gate electrode of the eighth PMOS transistor 412, a drain electrode of the eighth PMOS transistor 412 is connected with the tail current end of the differential circuit, a gate electrode of the fourth NMOS transistor 408 is connected with the current output end corresponding to the feedback end of the differential circuit (the gate electrode of the NMOS transistor 40), a drain electrode of the fourth NMOS transistor 408 is connected with a drain electrode and a gate electrode of the fifth PMOS transistor 409, the gate electrode of the fifth PMOS transistor 409 is connected with a gate electrode of the sixth PMOS transistor 410, source electrodes of the fifth PMOS transistor 409, the sixth PMOS transistor 410, the seventh PMOS transistor 411 and the eighth PMOS transistor 412 are connected with the VDD, and source electrodes of the third NMOS transistor 407 and the fourth NMOS transistor 408 are grounded.

The acceleration charging circuit 301 composed of the MOS transistors 407-412 is the same in principle as the acceleration charging circuit 301 composed of the MOS transistors 401-406, so as to achieve the purpose of implementing the acceleration response of the self-adaptive fast-response LDO circuit 101 by increasing the tail current to accelerate charging as long as there is imbalance between the two input ends of the differential circuit, thereby covering more application scenes. In other words, the third NMOS transistor 407 mirrors the current at the non-inverting input end in a preset ratio to obtain a fifth current, and the fourth NMOS transistor 408, the fifth PMOS transistor 409 and the sixth PMOS transistor 410 mirror the current at the inverting input end in a preset ratio to obtain a sixth current. Before the self-adaptive fast-response LDO circuit 101 is stably balanced, the currents corresponding to the two differential input ends are not equal, that is, the current at the non-inverting input end is not equal to the current at the inverting input end. When the sixth current is greater than the fifth current, the second differential sub-current obtained according to a difference between the sixth current and the fifth current is greater than 0, that is, the second differential sub-current can be output to the seventh PMOS transistor 411. The second differential sub-current is mirrored by the eighth PMOS transistor 412 and then output to the differential circuit as a tail current, so when the self-adaptive fast-response LDO circuit 101 starts to establish a response under the condition that the two differential input ends are unstable (the currents corresponding to the two differential input ends are not equal), the tail current will have a large charging current, which enables the self-adaptive fast-response LDO circuit 101 to be established in an extremely short time, so as to complete the fast response from unstable to stable. Moreover, after the stably balanced state of the circuit is established, voltages of the two differential input ends are equal or approximately equal, and at this time, the tail current of the differential circuit returns to a normal value. As a result, after the self-adaptive fast-response LDO circuit 101 is stabilized, the tail current of the differential circuit will return to the value of a balanced state and no longer consume the current, so the acceleration charging circuit 301 only affects the state before the circuit is stably balanced, but does not affect the stably balanced state of the circuit.

It should be noted that FIG. 2 not only shows the structure of the acceleration charging circuit 301, but also shows the specific structure of the error amplifier 201. For the convenience of understanding the principle of the acceleration charging circuit 301, only some MOS transistors therein are marked. Those skilled in the art can understand that other unmarked MOS transistors also form part of the differential circuit in the error amplifier.

Figure 3:
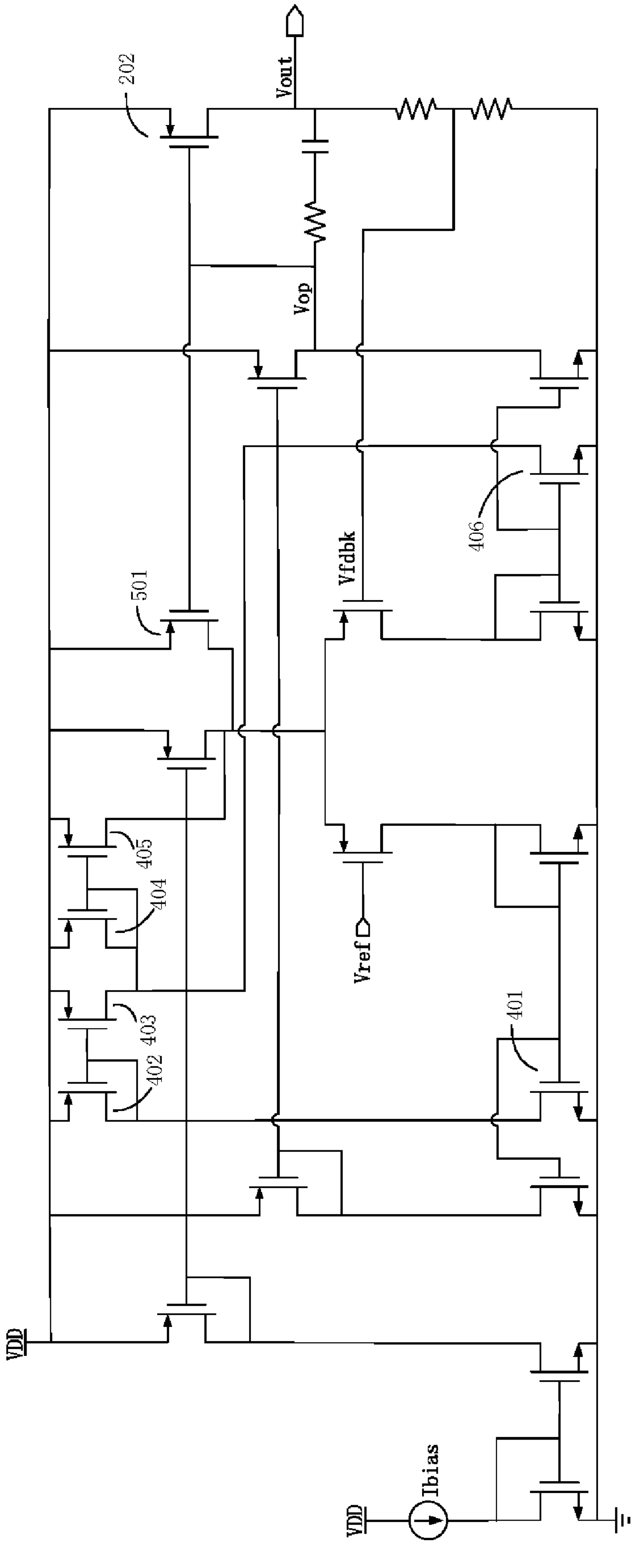
FIG. 3 is a schematic diagram of a self-adaptive charging and discharging circuit in the self-adaptive fast-response LDO circuit provided in this embodiment of the present invention.

As shown in FIG. 3, a self-adaptive acceleration charging and discharging circuit 302 is additionally provided on the basis of the acceleration charging circuit 301 and the error amplifier 201 shown in FIG. 2. The self-adaptive acceleration charging and discharging circuit 302 includes a ninth PMOS transistor 501. A gate electrode of the ninth PMOS transistor 501 is connected with the gate electrode of the power transistor 202, a drain electrode of the ninth PMOS transistor 501 is connected with the tail current end of the differential circuit, and a source electrode of the ninth PMOS transistor 501 is connected with the VDD.

By additionally providing the ninth PMOS transistor 501, the tail current of the differential circuit is increased so as to achieve the purpose of further increasing the response speed of the self-adaptive fast-response LDO circuit 101. When the self-adaptive fast-response LDO circuit 101 changes from an unstable state to a stable state or from a stable state to another stable state, the load current changes, which will cause the current flowing through the power transistor 202 to change accordingly, and the current of the power transistor is approximately equal to the load current. Therefore, the current of the power transistor 202 is mirrored in a preset ratio by the ninth PMOS transistor 501 as a tail current of the differential circuit, and the tail current is associated with the load change, so as to achieve the purpose of adjusting the magnitude of the tail current adaptively when the load changes. As a result, the self-adaptive acceleration charging and discharging circuit 302 can adaptively perform charging and discharging to enable the circuit to reach a stable state in a shorter time, and the self-adaptive fast-response LDO circuit 101 can adaptively accelerate the response to the change of the load. The ratio of the current of the power transistor 202 mirrored by the ninth PMOS transistor 501 is adjusted on the premise of meeting the power consumption, and the circuit can reach a stable state in a shorter time by the cooperation of the acceleration charging circuit and the acceleration discharging circuit.

Figure 4:
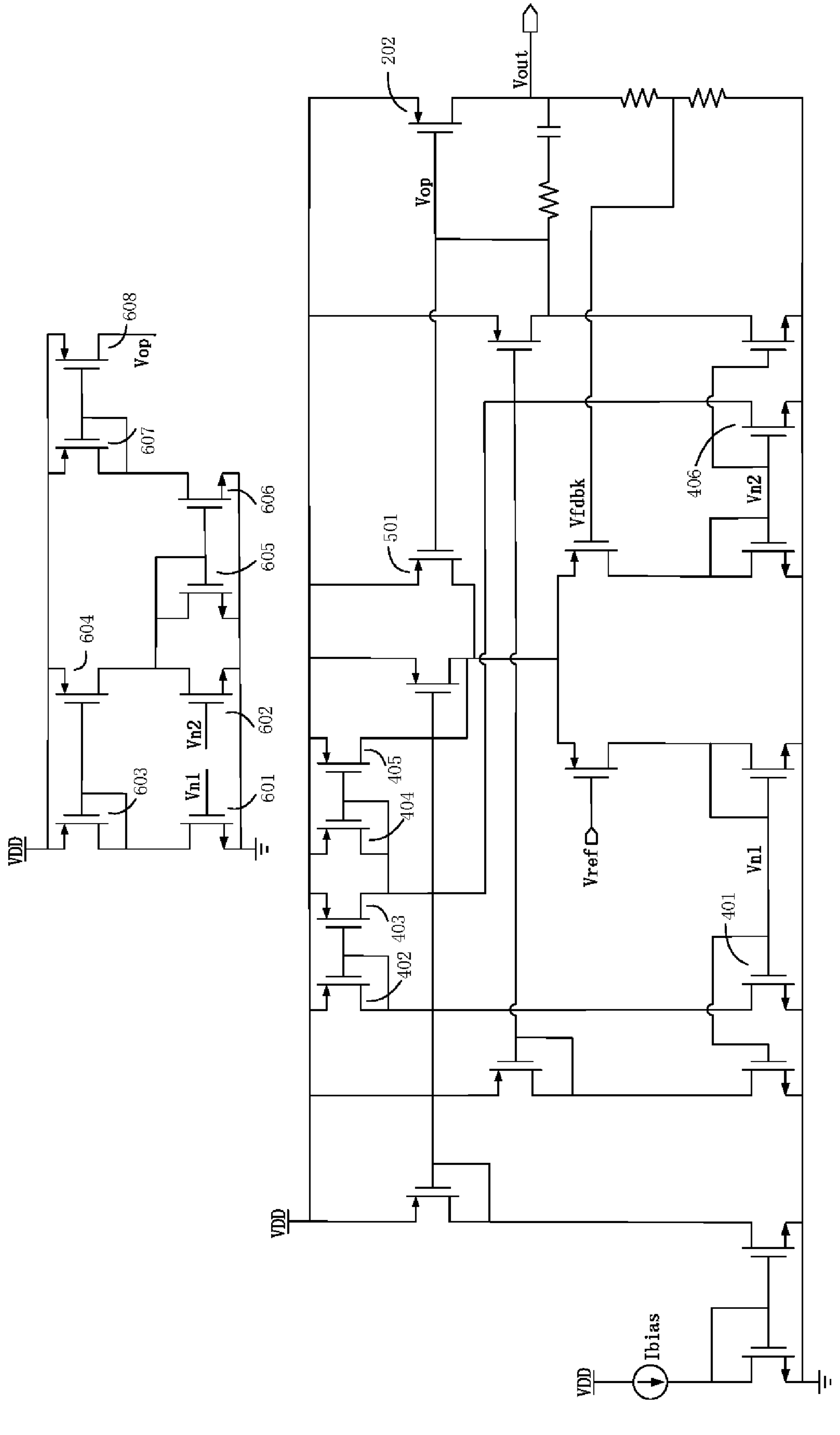
FIG. 4 is a schematic diagram of an acceleration discharging circuit in the self-adaptive fast-response LDO circuit provided in this embodiment of the present invention.

As shown in FIG. 4, an acceleration discharging circuit 303 is additionally provided on the basis of the self-adaptive acceleration charging and discharging circuit 302, the acceleration charging circuit 301 and the error amplifier 201 shown in FIG. 3. The acceleration discharging circuit 303 includes a fifth NMOS transistor 601, a sixth NMOS transistor 602, a tenth PMOS transistor 603, an eleventh PMOS transistor 604, a seventh NMOS transistor 605, an eighth NMOS transistor 606, a twelfth PMOS transistor 607, and a thirteenth PMOS transistor 608. A gate electrode of the fifth NMOS transistor 601 is connected with the first node Vn1, a drain electrode of the fifth NMOS transistor 601 is respectively connected with a gate electrode and a drain electrode of the tenth PMOS transistor 603, a gate electrode of the sixth NMOS transistor 602 is connected with the second node Vn2, a drain electrode of the sixth NMOS transistor 602 is respectively connected with a drain electrode of the eleventh PMOS transistor 604 and a gate electrode and a drain electrode of the seventh NMOS transistor 605, a gate electrode of the eleventh PMOS transistor 604 is connected with the gate electrode of the tenth PMOS transistor 603, the gate electrode of the seventh NMOS transistor 605 is connected with a gate electrode of the eighth NMOS transistor 606, a drain electrode of the eighth NMOS transistor 606 is respectively connected with a gate electrode and a drain electrode of the twelfth PMOS transistor 607, the gate electrode of the twelfth PMOS transistor 607 is connected with a gate electrode of the thirteenth PMOS transistor 608, a drain electrode of the thirteenth PMOS transistor 608 is connected with the gate electrode of the power transistor 202, source electrodes of the tenth PMOS transistor 603, the eleventh PMOS transistor 604, the twelfth PMOS transistor 607 and the thirteenth PMOS transistor 608 are respectively connected with the VDD, and source electrodes of the fifth NMOS transistor 601, the sixth NMOS transistor 602, the seventh NMOS transistor 605 and the eighth NMOS transistor 606 are respectively grounded.

The current at the non-inverting input end is mirrored in a preset ratio by the fifth NMOS transistor 601, the tenth PMOS transistor 603 and the eleventh PMOS transistor 604 to obtain a third current. The current at the inverting input end is mirrored in a preset ratio by the sixth NMOS transistor 602 to obtain a fourth current. Before the self-adaptive fast-response LDO circuit 101 is stably balanced, the currents at the two differential input ends are not equal. The second differential current obtained according to a difference between the third current and the fourth current is output to the seventh NMOS transistor 605, and is mirrored in a preset ratio by the seventh NMOS transistor 605, the eighth NMOS transistor 606, the twelfth PMOS transistor 607 and the thirteenth PMOS transistor 608 and then output to the gate electrode of the power transistor 202. As a result, during the transition from a high voltage to a low voltage of the self-adaptive fast-response LDO circuit 101, the acceleration response of the circuit is realized by controlling the gate electrode of the power transistor 202, thereby realizing the control of the voltage of the gate electrode of the power transistor 202 to accelerate charging in an extremely short time, so as to enable the self-adaptive fast-response LDO circuit 101 to quickly reach a stable state. Moreover, after the circuit is stably balanced, the currents at the two differential input ends return to the values of a balanced state, and no current is consumed, so the acceleration discharging circuit 303 only affects the state before the circuit is stably balanced, but does not affect the stably balanced state of the circuit.

The current mirror ratio of the acceleration charging circuit 301 to the acceleration discharging circuit 303 is determined together by the actual response speed required by the self-adaptive fast-response LDO circuit 101, the magnitude of the MOS transistors of the differential circuit, and the magnitude of the current when the circuit works stably, so as to avoid overshot and insufficient acceleration response of the self-adaptive fast-response LDO circuit 101. Therefore, an appropriate current mirror ratio is selected to achieve the best response effect.

The self-adaptive fast-response LDO circuit provided in this embodiment of the present invention can be used in an integrated circuit chip. The specific structure of the LDO circuit in the integrated circuit chip will not be described in detail here.

In addition, the self-adaptive fast-response LDO circuit provided in this embodiment of the present invention can also be used in electronic terminals as an important component of analog integrated circuits. The electronic terminals include mobile phones, laptop computers, tablet personal computers, on-board computers, etc. In addition, the technical solutions provided by the present invention are also applicable to other occasions of analog integrated circuit applications, such as communication base stations.

In conclusion, according to the LDO circuit provided in this embodiment of the present invention, by additionally providing the self-adaptive acceleration response circuit on the existing LDO circuit, on the one hand, the current of the power transistor is mirrored in a ratio, such that the tail current of the differential circuit in the error amplifier can accelerate charging and discharging adaptively according to load changes of the LDO circuit. On the other hand, before the circuit is stably balanced, the characteristics of unbalanced states of the two differential input ends of the error amplifier are used to perform current charging and discharging on the tail current of the differential circuit and the gate electrode of the power transistor in an extremely short time, such that the response time of the LDO circuit is greatly reduced, and the integrated circuit chip has a faster response speed, thereby satisfying high requirements for performance of an electronic terminal, such as conduction time, switching time and turn-off time.

The self-adaptive fast-response LDO circuit and the chip thereof provided in the embodiments of the present invention are described in detail above. Any non-essential changes and replacements made by those skilled in the art on the basis of the present invention fall within the protection scope of the present invention.

What is claimed is:

1. A self-adaptive low dropout regulator (LDO) circuit, comprising a band gap reference circuit, an error amplifier, a power transistor, a feedback resistor network, and a self-adaptive acceleration response circuit, wherein an output end of the band gap reference circuit is connected with a non-inverting input end of the error amplifier, an inverting input end of the error amplifier is connected with the feedback resistor network, an output of the error amplifier is connected with a gate electrode of the power transistor, the error amplifier and the power transistor are respectively connected with the self-adaptive acceleration response circuit, and a drain electrode of the power transistor is connected with the feedback resistor network;

wherein the self-adaptive acceleration response circuit comprises an acceleration charging circuit, a self-adaptive acceleration charging and discharging circuit, and an acceleration discharging circuit;

wherein:

the non-inverting input end and the inverting input end of the error amplifier are two differential input ends; a gate electrode of a PMOS transistor of a differential pair of the error amplifier is used as the non-inverting input end of the error amplifier to receive a reference voltage, and a drain electrode of the PMOS transistor is connected with a drain electrode of an NMOS transistor, a gate electrode of the NMOS transistor is connected with a first node, which is used as a first output end of the error amplifier corresponding to a reference voltage end of the error amplifier; a gate electrode of another PMOS transistor of the differential pair of the error amplifier is used as the inverting input end of the error amplifier to receive a feedback voltage, and a drain electrode of the another PMOS transistor is connected with a drain electrode of another NMOS transistor, a gate electrode of the another NMOS transistor is connected with a second node, which is used as a second output end of the error amplifier corresponding to a feedback voltage end of the error amplifier; source electrodes of the PMOS transistor and the another PMOS transistor of the differential pair are connected together as a tail current end of the error amplifier;

the acceleration charging circuit is configured to accelerate the charging process of the differential pair of the error amplifier and comprises a first N-channel metal oxide semiconductor (NMOS) transistor, a first P-channel metal oxide semiconductor (PMOS) transistor, a second PMOS transistor, a third PMOS transistor, a fourth PMOS transistor, and a second NMOS transistor, wherein a gate electrode of the first NMOS transistor is connected with the first node, a drain electrode of the first NMOS transistor is respectively connected with a drain electrode and a gate electrode of the first PMOS transistor, the gate electrode of the first PMOS transistor is connected with a gate electrode of the second PMOS transistor, a drain electrode of the second PMOS transistor is respectively connected with a drain electrode and a gate electrode of the third PMOS transistor and a drain electrode of the second NMOS transistor, the gate electrode of the third PMOS transistor is connected with a gate electrode of the fourth PMOS transistor, a drain electrode of the fourth PMOS transistor is connected with the tail current end of the error amplifier, and a gate electrode of the second NMOS transistor is connected with the second node, source electrodes of the first PMOS transistor, the second PMOS transistor, the third PMOS transistor and the fourth PMOS transistor are connected with a VDD, and source electrodes of the first NMOS transistor and the second NMOS transistor are grounded;

the self-adaptive acceleration charging and discharging circuit is respectively connected with the gate electrode of the power transistor and the tail current end of the differential pair of the error amplifier, to adaptively accelerate both charging and discharging by dynamically balancing a tail current of the tail current end based on load changes; and the acceleration discharging circuit is respectively connected with the first node, the second node and the gate electrode of the power transistor, to control a discharging speed of a gate voltage of the power transistor.

2. The self-adaptive LDO circuit according to claim 1, wherein the first NMOS transistor, the first PMOS transistor and the second PMOS transistor mirror the current through the NMOS transistor in a preset ratio to obtain a first current, and the second NMOS transistor mirrors the current through the another NMOS transistor in a preset ratio to obtain a second current; and when the second current is greater than the first current, a first differential sub-current is obtained according to a difference between the second current and the first current and is output to the third PMOS transistor, and the first differential sub-current is mirrored by the fourth PMOS transistor and then output to the error amplifier as the tail current.

3. The self-adaptive LDO circuit according to claim 2, wherein the acceleration charging circuit further comprises a third NMOS transistor, a fourth NMOS transistor, a fifth PMOS transistor, a sixth PMOS transistor, a seventh PMOS transistor, and an eighth PMOS transistor, wherein a gate electrode of the third NMOS transistor is connected with the first node, which corresponds to the first output end of the error amplifier corresponding to the reference voltage end of the error amplifier, a drain electrode of the third NMOS transistor is respectively connected with a drain electrode of the sixth PMOS transistor and a drain electrode and a gate electrode of the seventh PMOS transistor, the gate electrode of the seventh PMOS transistor is connected with a gate electrode of the eighth PMOS transistor, a drain electrode of the eighth PMOS transistor is connected with the tail current end of the error amplifier, a gate electrode of the fourth NMOS transistor is connected with the second node, which corresponds to the second output end of the error amplifier corresponding to the feedback voltage end of the error amplifier, a drain electrode of the fourth NMOS transistor is connected with a drain electrode and a gate electrode of the fifth PMOS transistor, and the gate electrode of the fifth PMOS transistor is connected with a gate electrode of the sixth PMOS transistor, source electrodes of the fifth PMOS transistor, the sixth PMOS transistor, the seventh PMOS transistor and the eighth PMOS transistor are connected with the VDD, and source electrodes of the third NMOS transistor and the fourth NMOS transistor are grounded.

4. The self-adaptive LDO circuit according to claim 3, wherein the third NMOS transistor mirrors the current through the NMOS transistor in a preset ratio to obtain a fifth current, and the fourth NMOS transistor, the fifth PMOS transistor and the sixth PMOS transistor mirror the current through the another NMOS transistor in a preset ratio to obtain a sixth current; and when the sixth current is greater than the fifth current, a second differential sub-current is obtained according to a difference between the sixth current and the fifth current and is output to the seventh PMOS transistor, and the second differential sub-current is mirrored by the eighth PMOS transistor and then output to the error amplifier as the tail current.

5. The self-adaptive LDO circuit according to claim 4, wherein the self-adaptive acceleration charging and discharging circuit comprises a ninth PMOS transistor, wherein a gate electrode of the ninth PMOS transistor is connected with the gate electrode of the power transistor, and a drain electrode of the ninth PMOS transistor is connected with the tail current end of the error amplifier.

6. The self-adaptive LDO circuit according to claim 5, wherein the acceleration discharging circuit comprises a fifth NMOS transistor, a sixth NMOS transistor, a tenth PMOS transistor, an eleventh PMOS transistor, a seventh NMOS transistor, an eighth NMOS transistor, a twelfth PMOS transistor, and a thirteenth PMOS transistor, wherein a gate electrode of the fifth NMOS transistor is connected with the first node, a drain electrode of the fifth NMOS transistor is respectively connected with a gate electrode and a drain electrode of the tenth PMOS transistor, a gate electrode of the sixth NMOS transistor is connected with the second node, a drain electrode of the sixth NMOS transistor is respectively connected with a drain electrode of the eleventh PMOS transistor and a gate electrode and a drain electrode of the seventh NMOS transistor, a gate electrode of the eleventh PMOS transistor is connected with the gate electrode of the tenth PMOS transistor, the gate electrode of the seventh NMOS transistor is connected with a gate electrode of the eighth NMOS transistor, a drain electrode of the eighth NMOS transistor is respectively connected with a gate electrode and a drain electrode of the twelfth PMOS transistor, the gate electrode of the twelfth PMOS transistor is connected with a gate electrode of the thirteenth PMOS transistor, and a drain electrode of the thirteenth PMOS transistor is connected with the gate electrode of the power transistor, source electrodes of the tenth PMOS transistor, the eleventh PMOS transistor, the twelfth PMOS transistor and the thirteenth PMOS transistor are respectively connected with the VDD, and source electrodes of the fifth NMOS transistor, the sixth NMOS transistor, the seventh NMOS transistor and the eighth NMOS transistor are respectively grounded.

7. The self-adaptive LDO circuit according to claim 6, wherein the fifth NMOS transistor, the tenth PMOS transistor and the eleventh PMOS transistor mirror the current through the NMOS transistor in a preset ratio to obtain a third current, and the sixth NMOS transistor mirrors the current through the another NMOS transistor in a preset ratio to obtain a fourth current; and a second differential current obtained according to a difference between the third current and the fourth current and is output to the seventh NMOS transistor, and the second differential current is mirrored by the seventh NMOS transistor, the eighth NMOS transistor, the twelfth PMOS transistor and the thirteenth PMOS transistor and then output to the gate electrode of the power transistor.

8. The self-adaptive LDO circuit according to claim 7, wherein the self-adaptive acceleration response circuit obtains a first differential current and the second differential current respectively according to values at the two differential input ends in the error amplifier and establishes a mirror in a preset ratio, and then, the mirror is correspondingly output to the gate electrode of the power transistor and the differential pair of the error amplifier as the tail current thereof to accelerate discharging or charging, wherein the first differential current is the first differential sub-current, or the first differential current is the superposition of the first differential sub-current and the second differential sub-current.

9. The self-adaptive LDO circuit according to claim 1, wherein the self-adaptive acceleration response circuit establishes a mirror of a current of the power transistor in a preset ratio as the tail current of the error amplifier, so as to accelerate discharging or charging according to the load changes.

10. An integrated circuit chip, comprising the self-adaptive LDO circuit according to claim 1.

* * * * *